April 16, 1968 K. A. J. HEAD 3,377,895
LATHE STEADIES
Filed Dec. 12, 1966 2 Sheets-Sheet 1

INVENTOR
KENNETH AUBREY JOSEPH HEAD
BY Young + Thompson
ATTORNEYS

April 16, 1968     K. A. J. HEAD     3,377,895

LATHE STEADIES

Filed Dec. 12, 1966     2 Sheets-Sheet 2

INVENTOR
KENNETH AUBREY JOSEPH HEAL
BY
Young + Thompson
ATTORNEYS

United States Patent Office 3,377,895
Patented Apr. 16, 1968

3,377,895
LATHE STEADIES
Kenneth Aubrey Joseph Head, 2 Edmund St.,
Wiltshire, Swindon, England
Filed Dec. 12, 1966, Ser. No. 601,090
8 Claims. (Cl. 82—35)

ABSTRACT OF THE DISCLOSURE

A lathe steady incorporating a steady roller having a frusto-conical outer periphery and mounted on a roller slide for adjustment in a direction at right angles to the rotational axis of the roller. In use the rotational axis of the roller is inclined to the turning axis of the lathe to provide line contact between the roller and the work. A box tool incorporating such a lathe steady has a tool holder which is adjustable in a direction having the same inclination to the turning axis as the direction of roller slide adjustment.

---

This invention relates to lathe steadies of the roller type, and is of advantageous application to box tools for use with turret lathes. Such box tools, which are sometimes referred to as "steady turning tools," have a body for bolting to the turret face and on which are adjustably mounted a tool holder and two steady rollers. In use the turning tool is set slightly in front of the rollers in the direction of the turning axis so that when the bar diameter is reduced the rollers immediately support the work and ensure adequate support as turning proceeds.

According to the invention a lathe steady incorporates a steady roller having a frusto-conical outer periphery and mounted on a roller slide for adjustment in a direction at right angles to the rotational axis of the roller, in use the rotational axis of the roller being inclined to the turning axis of the lathe to provide line contact between the roller and the work. Thus the steady is set up so that the rotational axis is inclined to the turning axis at half the cone angle of the peripheral roller surface.

As applied to a box tool for a turret lathe the invention will normally provide the usual two steady rollers, each with a frusto-conical periphery as described and mounted on roller slides for adjustment to suit the turning diameter. A turning tool holder of the box tool is conveniently so arranged that the turning tool when mounted therein is adjustable in a direction having the same effective inclination to the turning axis as the direction of roller slide adjustment. This arrangement of the same inclination for the roller and tool adjustment axes ensures that a given advance of the tool relatively to the rollers in the direction of the turning axis is retained at any cutting diameter to which the box may be set.

The novel shape and arrangement of the rollers with a box tool in accordance with the invention renders the rollers less liable to jamming by swarf, and also has the advantage that the leading edge of each roller can more easily approach with adequate side clearance up to a machined shoulder. Preferably the tool holder of the box tool is used with a tool such that the cutting edge of the latter is always in advance of the rollers by approximately 0.015 inch, and the cone angle of the rollers is conveniently of the order of 40°.

Figure 1:
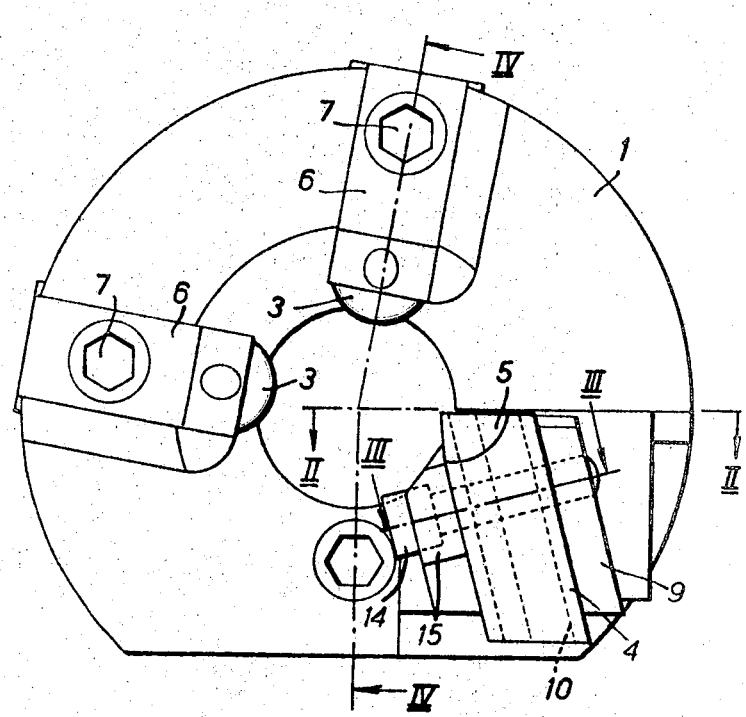
Figures 2, 3:
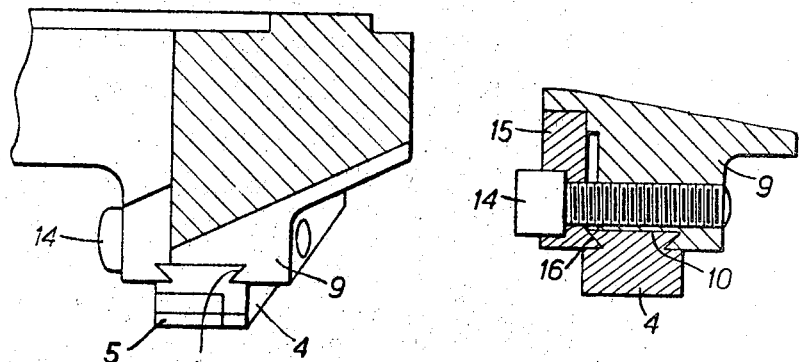
Figure 4:
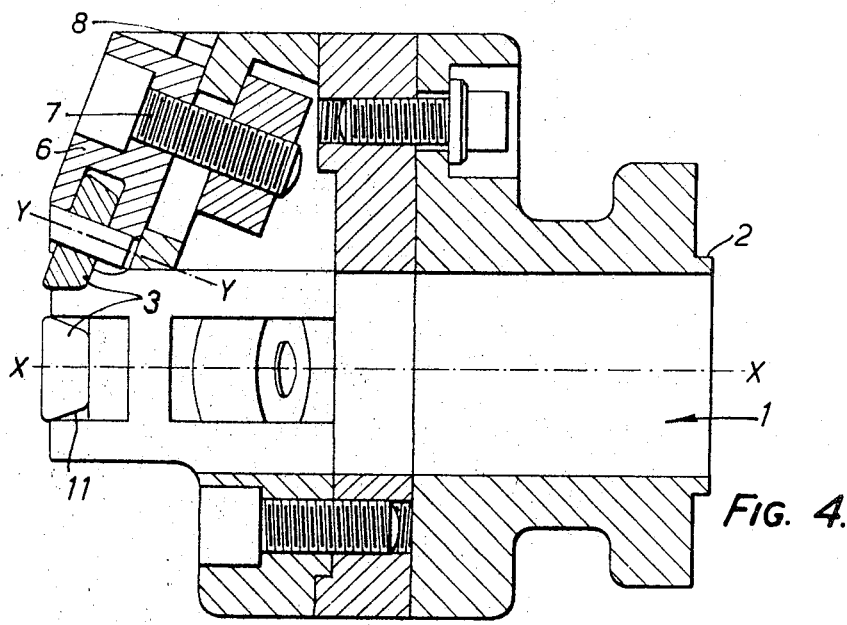
Figure 5:
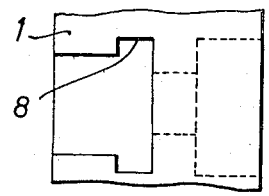
Figure 6:
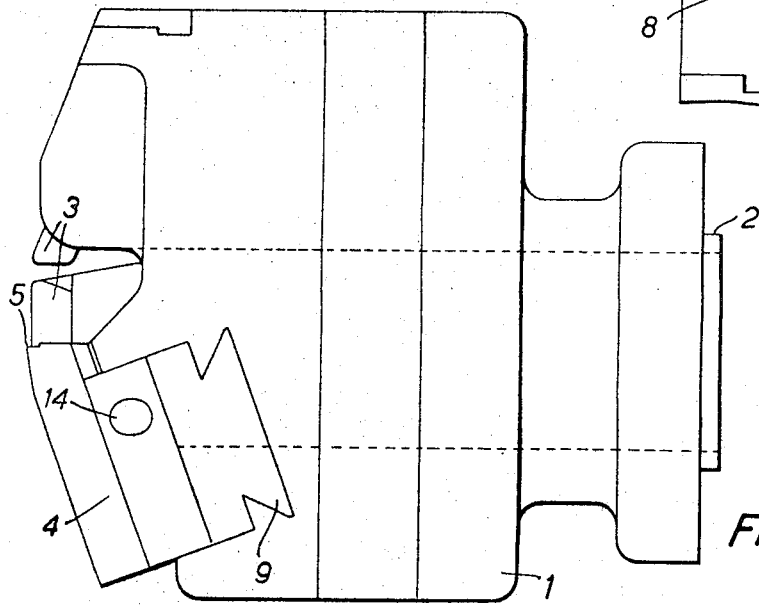

An illustrative embodiment of the invention in the form of a roller box tool will now be described by way of example with reference to the accompanying drawings, in which:

FIGURE 1 is an elevation of the roller box tool looking along the turning axis of the lathe from the headstock end, FIGURE 2 is a sectional view on the line II—II of FIGURE 1, FIGURE 3 is a scrap sectional view on the line III—III of FIGURE 1, FIGURE 4 is a sectional view on the line IV—IV of FIGURE 1, FIGURE 5 is a scrap view of a part of FIGURE 4, and FIGURE 6 is a side view of the roller box.

The box has a hollow body 1 formed for attachment to a lathe turret (not shown) in a position accurately aligned with the turning axis X—X. The body 1 has the usual rear spigot location 2 for the turret face and at the forward end presents two steady rollers 3 and a tool holder 9 for a tipped turning tool 4 with a brazed-on tip 5. The rollers 3 are mounted on slides 6 each provided with a locking screw adjustment 7 and slidable in a T-slot 8 in the body 1 so that the rollers can be adjusted radially to suit the diameter to be turned; the tool holder 9 is formed as a dovetail tool slide and the tool 4 has a dovetail formation at 10 so that it acts, in effect, as a cross slide mounted on the tool slide 9 to enable the tool to be adjusted tangentially of the work. This is the more usual form of adjustment but an alternative radial tool arrangement can equally well be employed if desired.

The rollers 3 are identical and have a frusto-conical outer periphery 11 corresponding to a cone angle of 40°. Each roller 3 is rotatably mounted in the corresponding slide 6 to turn about the cone axis Y—Y which is inclined to the lathe turning axis X—X at half the cone angle, i.e. 20° in the embodiment illustrated, in order to provide line contact with the work. Each roller slide 6 is adjustable along a line of approach at right angles to the corresponding rotational axis Y—Y of the roller 3 and the tool slide 9 is adjustable along a similarly inclined axis relatively to the turning axis X—X.

The tool 4 is clamped in the desired position by a bolt 14 which passes through a clamping plate 15 and is threaded into the slide 9. The plate 15 is formed with a wedge-shaped edge lip 16 which fits into one side of the dovetail 10 of the tool 4.

Before machining the tool 4 is set up in the usual manner to suit the turning diameter, the effective cutting edge of the tool tip 5 being in advance of the rollers 3 in the direction of the turning axis X—X by a suitable amount which is conveniently approximately 0.015 inch. The use of the same angle of approach for each roller 3 and the tool slide 9 provides an arrangement in which the preset advance of the tool is still maintained if the tool is reset to suit a different machining diameter.

What is claimed is:

1. A lathe steady incorporating a steady roller having a frusto-conical outer periphery and mounted on a roller slide for adjustment in a direction at right angles to the rotational axis of the roller, in use the rotational axis of the roller being inclined to the turning axis of the lathe to provide line contact between the roller and the work.

2. A box tool for a turret lathe incorporating a lathe steady according to claim 1, wherein a tool holder is provided which is adjustable in a direction having the same inclination to the turning axis as the direction of roller slide adjustment.

3. A box tool for a turret lathe according to claim 2, wherein the tool holder is so arranged that the tool cutting edge is in use set slightly in front of the roller so that when the work diameter is reduced the roller immediately supports the work and ensures adequate support as turning proceeds.

4. A box tool for a turret lathe according to claim 3, wherein the tool when fitted is in advance of the roller by approximately 0.015 inch.

5. A lathe steady according to claim 1, wherein the cone angle of the roller is of the order of 40°.

6. A lathe steady according to claim 1, wherein two rollers are provided which, in use, are angularly spaced about the turning axis of the lathe.

7. A box tool for a turret lathe according to claim 2, wherein the cone angle of the roller is of the order of 40°.

8. A box tool for a turret lathe according to claim 2, wherein two rollers are provided which, in use, are angularly spaced about the turning axis of the lathe.

References Cited
UNITED STATES PATENTS 3,225,631  12/1965  Hermann _____ 82—39

FOREIGN PATENTS 841,896  7/1960  Great Britain.

LEONIDAS VLACHOS, *Primary Examiner.*